United States Patent [19]

Olsson

[11] Patent Number: 4,941,567

[45] Date of Patent: Jul. 17, 1990

[54] CONVEYOR BELT

[75] Inventor: Lennart Olsson, Nyhamnsläge, Sweden

[73] Assignee: Frigoscandia Contracting AB, Helsingborg, Sweden

[21] Appl. No.: 209,683

[22] PCT Filed: Dec. 22, 1986

[86] PCT No.: PCT/SE86/00582

§ 371 Date: Jun. 21, 1988

§ 102(e) Date: Jun. 21, 1988

[87] PCT Pub. No.: WO87/04136

PCT Pub. Date: Jul. 16, 1987

[30] Foreign Application Priority Data

Dec. 27, 1985 [SE] Sweden .................................. 8506136

[51] Int. Cl.⁵ .............................................. B65G 21/18
[52] U.S. Cl. ..................................... 198/778; 198/831
[58] Field of Search ......................... 198/778, 831, 852

[56] References Cited

U.S. PATENT DOCUMENTS

| | | | |
|---|---|---|---|
| 3,938,651 | 2/1976 | Alfred et al. | 198/778 |
| 4,036,352 | 7/1977 | White | 198/778 |
| 4,450,953 | 5/1984 | LeCann et al. | 198/778 |
| 4,565,282 | 1/1986 | Olsson et al. | 198/778 |
| 4,603,776 | 8/1986 | Olsson | 198/778 |
| 4,741,430 | 5/1988 | Roinestad | 198/778 |

FOREIGN PATENT DOCUMENTS 381241 1/1975 Sweden .
437008 4/1985 Sweden .

Primary Examiner—Robert J. Spar
Assistant Examiner—Cheryl L. Gastineau
Attorney, Agent, or Firm—Browdy and Neimark

[57] ABSTRACT

A conveyor belt is adapted in endless design to follow, through a part of its length, a path comprising a number of superimposed, helically extending tiers. The conveyor belt consists of mutually articulated and relatively adjustable links, each comprising a bottom part and spacers arranged at the longitudinal edges of the bottom part, the spacers forming the two sides of the belt, the upper edge portions of the spacers being adapted to engage the lower edge portions of overlying tiers of the conveyor belt and fixedly connected through a part of their length to the longitudinal edges of the bottom part, the remaining part being movable relative to the bottom part. Each spacer is provided with shoulders mutually displaced in both the longitudinal direction and the lateral direction of the belt, to engage with both the inner side and the outer side of the an upper edge portion of the spacer of the underlying belt tier, thereby to positively guide the edge portion in the lateral direction.

4 Claims, 3 Drawing Sheets

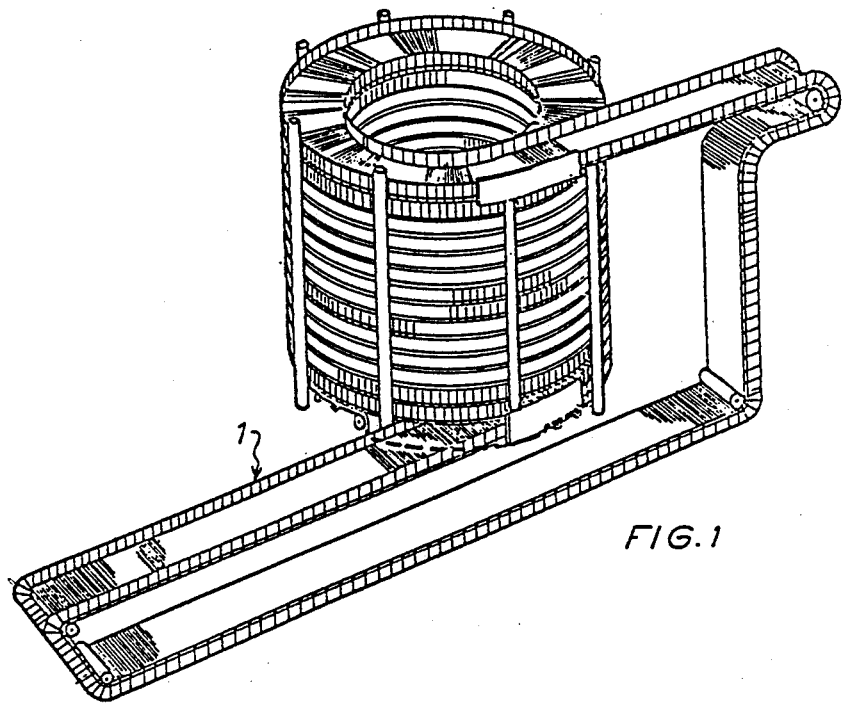
FIG.1
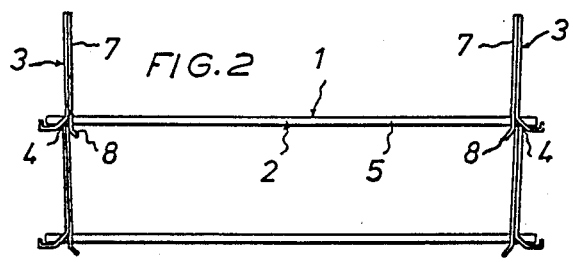
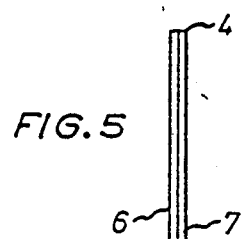
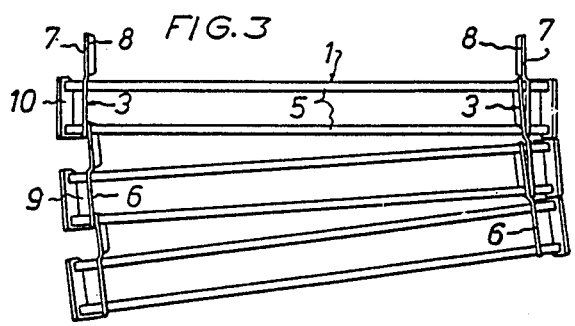

FIG. 8a  (PRIOR ART)
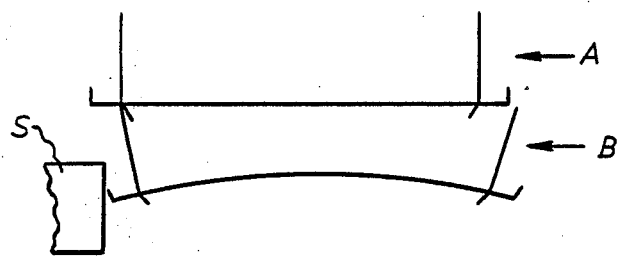
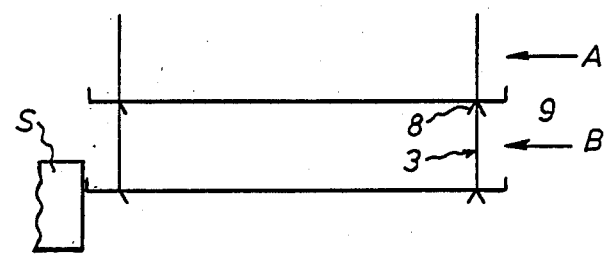
FIG. 8b

CONVEYOR BELT

The present invention relates to a conveyor belt which is adapted in endless design to follow, through part of its length, a path comprising a number or superimposed, helically extending tiers forming a belt pile.

Such a conveyor belt is previously known from SE patent No. 381,241 and SE patent application No. 8206760-4 and consists of mutually articulated and relatively adjustable link means, each comprising a bottom part and spacer means arranged at the longitudinal edges of said bottom part, said spacer means forming the two sides of the belt and being adapted, with their upper edge portions, to bear against the lower edge portions of the overlying tier of the conveyor belt. In this manner, each belt tier is supported by an underlying belt tier and supports itself an overlying belt tier.

In order to prevent relative lateral displacement of the superimposed belt tiers, at least a part of the spacer means according to the SE patent are adapted to engage shoulders at the lower edge portions of said spacer members on at least one side of the overlying tier of the conveyor belt.

According to SE patent application No. 8206760-4, the spacer means through part of their length are fixedly connected to the longitudinal edges of the bottom part, while the remaining part is movable relative to the bottom part and provided with a flange which is inclined downward and inward, i.e. toward the center of the belt, said flange forming, together with the flanges of adjacent spacer means, shoulders with which the upper edge portions of the spacer means on the underlying belt tier are adapted to engage to prevent relative lateral displacement of the belt tiers.

If it is attempted to increase the eight of the belt pile or to increase the width or height of the link means, and thus the width or height of each tier, the above conveyor belt constructions constitute an obstacle in so far as the risk that the belt pile may collapse will quickly exceed permissible limits. Although higher strength and rigidity may be obtained by increasing the dimensions of the parts included in the link means, this will also increase the weight of the conveyor belt, resulting in such an increased load on the bottom tier of the belt pile that the entire belt pile tends to collapse.

It therefore is the object of the present invention to make it possible to increase the dimensions of both the conveyor belt and the belt pile without causing the risk of a collapse to exceed a safe limit.

The construction according to the invention precludes any possibility of an undesired lateral relative displacement of the belt tiers in the belt pile, and this is accomplished by the mutual positive guiding in the lateral direction between the spacer means in superimposed belt tiers.

More particularly, the present invention pays regard to the fact that one important cause of a collapse is the tensile force which is generated in the conveyor belt by the friction in the return path from the point where the belt leaves the belt pile to the point where it reenters the pile. The tensile force strives to contract the lowermost belt tier which, however, normally is held in position by an internal supporting ring. In the prior art conveyor belts, the tensile force must then be absorbed completely by the first belt tier free from the supporting ring.

The conveyor belt construction according to the invention makes the belt pile act essentially as a single stable drum which thus is able, via several belt tiers, to absorb the belt tension caused by said tensile force and to effectively prevent contraction of the belt pile immediately above the supporting ring.

By the construction according to the invention, the link means positioned in superimposed belt tiers will be firmly interengaged, at least on the outer side of the belt pile, in contrast to the loose interengagement of the prior art constructions. In this manner, the strength of the belt pile could be increased many times over.

The considerable increase in strength can be utilised for selecting thinner and thus lighter materials for the link means and/or for giving the total belt pile a size that would be impossible under other circumstances.

Furthermore, the invention makes it possible to use the same basic material, i.e. in respect of thickness, for manufacturing the components of the link means, irrespective of the width and height of the belt and the number of tiers in the pile, and this is a considerable advantage from the viewpoint of manufacture.

The invention will be described in more detail hereinafter, reference being had to the accompanying drawings.

FIG. 1 is a perspective view of a conveying device for which the conveyor belt according to the invention is intended.

FIG. 2 is a schematic cross-sectional view of the link means of two belt tiers, and FIG. 3 shows a part of the conveyor belt from above.

FIGS. 5 and 6 show the spacer means in FIG. 4 as seen in the longitudinal direction of the conveyor belt and from below, respectively.

FIG. 8a illustrates schematically the deformation of link means adjacent a supporting ring.

Figure 4:
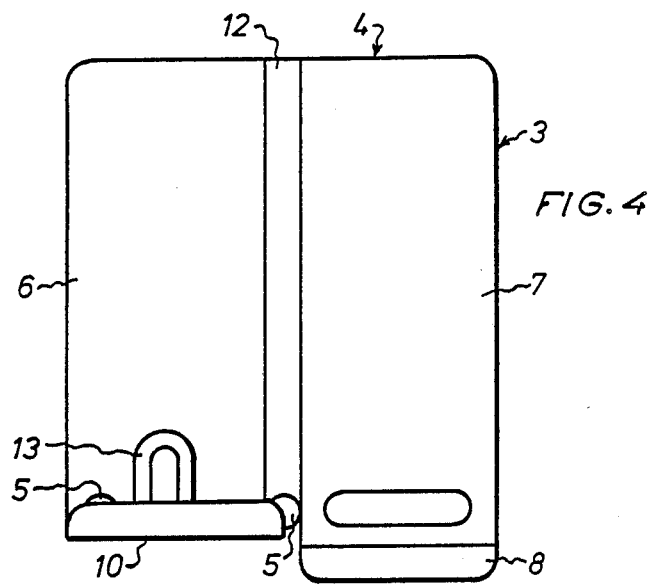
FIG. 4 is a lateral view of an embodiment of a spacer means according to the invention.

An endless conveyor belt 1 intended, for example, for a conveying device of the type illustrated in FIG. 1 is adapted to follow, in the manner illustrated, through part of its length a path comprising a number of superimposed helically extending tiers. The conveyor belt 1, partially illustrated in FIGS. 2 and 3, comprises a number of mutually articulated and relatively adjustable link means consisting of a bottom part 2 and, disposed at the ends thereof, links 3 which form the two sides of the conveyor belt and, at the same time, are designed as spacer means, the upper edge portions 4 of which bear against the lower edge portions of the spacer means of the overlying belt tier and thus support the overlying belt tier via the respective edge portions.

In the embodiment illustrated, the bottom part 2 consists of transverse rod-shaped connecting elements 5 for the links 3. These connecting elements 5 may be coated with wire, netting or the like to serve as a supporting plane and permit adjustment of the link means by mutual displacement thereof in the longitudinal direction of the belt 1.

The spacer means or links 3 are through a part 6 of their length fixedly connected to the longitudinal edges of the bottom part 2. In the embodiment illustrated, this is achieved in that they are fixedly connected with two of the rod-shaped elements 5 which are spaced apart in the longitudinal direction of the belt. The remaining part 7 of the spacer means 3, which extends in the longitudinal direction beyond the said two rod-shaped elements 5, is movable relative to the bottom part 2 and provided with downwardly and inwardly inclined flange 8. The flanges 8 of the successive spacer means 3 form inner shoulders engaging the inner side of the upper edge portion 4 of the spacer means 3 of the underlying belt tier. According to the invention, the lower portion 9 of the part 6 is inclined in a downward and outward direction and continues in a further outwardly angled portion 10 extending essentially perpendicular to the belt side. The inclined portions 9 of the successive links 3 thus form outer shoulders engaging the outer side of the upper edge portion 4 of the spacer means 3 of the underlying belt tier. In this manner, the upper edge portion 4 is positively guided in the lateral direction between the oppositely directed shoulders formed by the flanges 8 and the inclined portions 9 arranged alternately in the longitudinal direction of the belt.

To prevent the upper edge portion 4 from being wedged between the oppositely directed shoulders and to give each belt tier a well defined height, supporting means are fixedly arranged on the inner side of the inclined portions 9 having a supporting surface 11 essentially perpendicular to the belt side. The supporting surface 11 is suitably formed by the bottom part 2 and may preferably consist of the underside of the rod-shaped elements 5 which, in the embodiment illustrated, extend through holes in the inclined portion 9 to engage with their outer end the upper side of the portions 10, for example by welding.

The shoulders which, in accordance with the invention, are mutually displaced both in the longitudinal and in the lateral direction of the belt, make it possible to achieve a positive lateral guiding of the upper edge portion 4 of the underlying spacer means 3, simultaneously as the belt can move along a curve, as shown in FIG. 3.

Via a transition 12, the part each spacer means 3, which is fixed relative to the bottom part 2, is slightly laterally displaced relative to the movable part 7, the part 6 being arranged to overlap on the outer side the part 7 of the adjacent spacer means. The part 7 also has an oblong hole 13 to receive an elongated element associated with an adjacent spacer means, and to facilitate adjustment of the link means relative to one another by longitudinal displacement of the part 6 of a spacer means in relation to the part 7 of an adjacent spacer means.

Figure 6:
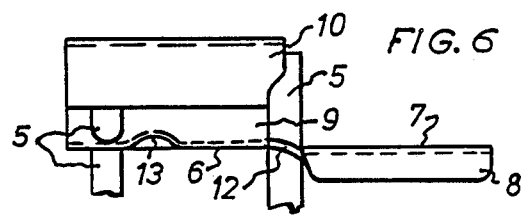
Figure 7:
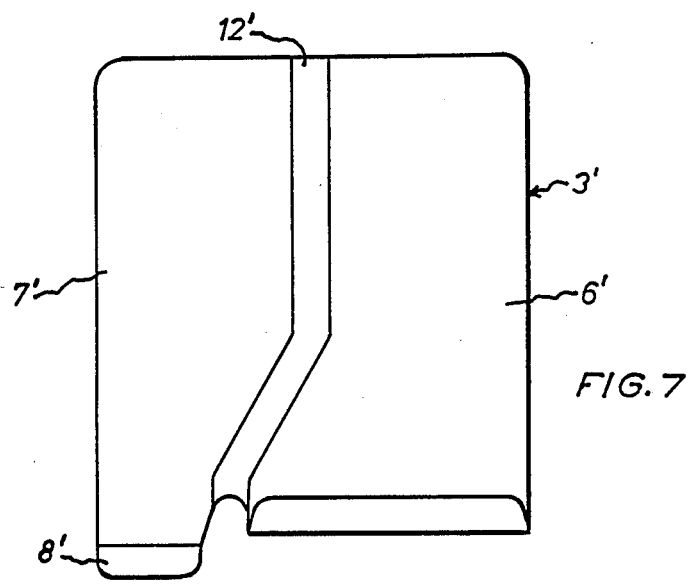
FIG. 7 is a view, corresponding to FIG. 4, of a second embodiment of a spacer means according to the invention

In FIG. 4, the transition between the parts 6 and 7 is straight, but may also have the curved shape illustrated at 12' in FIG. 7 where the inclined portion of the part 6' is longer than the flange 8' of the part 7'. Furthermore, the part 7' has no oblong hole since the spacer means according to FIG. 7 is suitable for entirely straight belt conveyors or preferably is arranged in the outer curve when the conveyor travels through a curve. Thus, a spacer means 3' according to FIG. 7 may be combined with the spacer means 3 according to FIGS. 4-6.

The transition 12, 12' contributes to increasing the rigidity of the spacer means 3 and 3', respectively. An increased flexural rigidity in the connection between the spacer means 3 and the bottom part 2 is achieved by means of a vertical ridge 13 formed in the lower portion of the part 6.

To achieve the main part of the effect according to the invention, it suffices that the spacer means 3 on the outer side of the belt pile are formed in the manner described above, with the shoulders 8, 9 for engagement with both the inner side and the outer side of the upper edge portion 4 of the spacer means 3 of the underlying belt tier, while the spacer means 3 on the inner side of the belt pile merely require the shoulders 8 for engagement with the inner side (as seen toward the center of the belt) of the upper edge portion 4 of the spacer means 3 of the underlying belt tier.

The effect provided by the construction according to the invention will appear from FIG. 8. At FIG. 8a, a schematic section radially through two tiers of a conveyor belt according to prior art technique is shown, FIG. 8b shows the same section for a conveyor belt according to the present invention. It will be evident that, in the conveyor belt according to prior art technique, the load on a belt tier A above a belt tier B engaging an inner supporting ring S causes a deformation of the link means of the belt tier B, such that the belt pile may collapse because the belt tier A partially drops into the belt tier B. The risk of such a collapse is completely eliminated with the conveyor belt according to the invention where the upper edge portion of the outer link 3 in the belt tier B is fixedly clamped against the lower edge portion of the links of the belt tier A, i.e. between the shoulders 8 and 9 thereof. Practical tests have shown that this fixed clamping actually increases the strength of the belt pile by almost a tens power.

A number of modifications of the conveyor belt as described above are conceivable within the scope of the invention. For example, the shoulders 8 and 9 need not be longitudinally displaced relative to one another, although such displacement is preferred because it makes it possible to manufacture the spacer means 3 in a single piece from a simple sheet-metal blank.

I claim:

1. A conveyor belt which is adapted in endless design to follow, through a part of its length, a path comprising a number of superimposed, helically extending tiers forming a belt pile, said belt conveyor consisting of mutually articulated and relatively adjustable link means, each comprising a bottom part (2) and spacer means (3) arranged at the longitudinal edges of said bottom part and forming the two sides of the belt, said spacer means being adapted, with their upper edge portions (4), to bear against the lower edge portions of the overlying tier of the conveyor belt and being fixedly connected, through a part (6) of their length, to the longitudinal edges of said bottom part, and and through the remaining part (7), being movably relative to said bottom part, characterized in that each spacer means (3) on the outer side of the belt pile is provided with shoulders (8, 9) mutually displaced in the lateral direction of the belt (1) and, for engaging both the inner and the outer side of an upper edge portion (4) of the corresponding spacer means of the underlying belt tier, and thus for positively guiding this edge portion in both lateral directions between said oppositely directed shoulders, and that each spacer means (3) on the inner side of the belt tier has at least those shoulders (8) which are intended to engage the inner side of an upper edge portion (4) of the corresponding spacer means of the underlying belt tier, and characterised in that the shoulder of the spacer means (3), which shoulder is intended to engage the inner side of said upper edge portion (4), is formed by a flange (8) which is directed obliquely downwardly and inwardly from the spacer means part (7) which is movable relative to said bottom part (2), and that the shoulder of said spacer means (3), which shoulder is intended to engage the outer side of said upper edge portion (4), is formed by a lower portion (9) of the spacer means part (6) which is fixed relative to said bottom part (2), said portion (9) being angled obliquely downwardly and outwardly.

2. A belt conveyor as claimed in claim 1, characterised by supporting members fixedly connected with and extending inwardly from the shoulder (9) engaging the outer side of said edge portion (4), to form a supporting surface (11) adapted to support the spacer means (3) on the said edge portion (4).

3. A belt conveyor as claimed in claim 2, characterised in that the bottom part (2) is formed by rod-shaped elements (5) extending in the lateral direction of the belt (1) and fixedly connected at each end to that part (6) of a spacer means (3) which is fixed relative to said bottom part, said supporting members comprising a substantially horizontal lower side of said rod-shaped elements forming the said supporting surface (11).

4. A belt conveyor as claimed in claims 1, characterised in that each rod-shaped element (5) extends through a hole in the obliquely downwardly and outwardly angled lower portion (9) of that part of a spacer means (3) which is fixed relative to said bottom part (2), and is fixedly connected to a further outwardly angled portion (10) which forms an extension of said obliquely downwardly and outwardly angled portion (9).

* * * * *